March 17, 1964 K. D. BROADBENT 3,125,746

THIN FILM MAGNETIC DEVICE

Filed Aug. 3, 1959 4 Sheets-Sheet 1

INVENTOR.
KENT D. BROADBENT,
BY
E. L. Oberheim
AGENT.

March 17, 1964 K. D. BROADBENT 3,125,746

THIN FILM MAGNETIC DEVICE

Filed Aug. 3, 1959 4 Sheets-Sheet 2

INVENTOR
KENT D. BROADBENT,
BY E. L. Oberheim
AGENT

March 17, 1964 K. D. BROADBENT 3,125,746

THIN FILM MAGNETIC DEVICE

Filed Aug. 3, 1959 4 Sheets-Sheet 3

INVENTOR.
KENT D. BROADBENT,
BY
E. L. Oberheim
AGENT.

INVENTOR.
KENT D. BROADBENT,
BY
E. L. Olsen
AGENT

United States Patent Office 3,125,746

Patented Mar. 17, 1964

3,125,746

THIN FILM MAGNETIC DEVICE

Kent D. Broadbent, San Pedro, Calif., assignor to Hughes Aircraft Company, Culver City, Calif., a corporation of Delaware Filed Aug. 3, 1959, Ser. No. 831,314
18 Claims. (Cl. 340—174)

This invention relates to magnetic devices and more particularly to magnetic elements constructed of a plurality of thin film layers.

This application is a continuation-in-part of the copending application of Kent D. Broadbent, Serial No. 699,737, filed November 29, 1957, now abandoned, entitled "Magnetic Device."

It has long been recognized that effective miniaturization of electronic systems could be achieved if electronic components could be formed by a technique such as vacuum deposition. In complex apparatus such as digital computers, for example, such structures would be extremely useful since this method of manufacture would enable large numbers of components and circuits to be deposited simultaneously. Additionally, reduction in size of the components should reduce operating power requirements.

In general, a fundamental component in the electronic art is a device which provides an output upon the concurrence of a plurality of input signals. Such a device, which is commonly called an "and" gate, is described herein. However, the operation of the "and" gate which is the subject of this invention is such that it can be used to great advantage to replace the magnetic core element which is presently used extensively in a coincident current memory system. A basic coincident current memory system is described in Chapter 8 of a book entitled "Digital Components & Circuits" by R. K. Richards, published by D. Van Nostrand Company, Inc., Princeton, New Jersey, 1957, at pp. 354–365.

The "coincident current" selection technique utilizes the rectangular nature of the hysteresis loop of the magnetic material employed in the magnetic element. In general, the magnetic elements forming the memory are arranged in a two or three-dimensional array. A winding is passed through each element composing the array for each dimension used; thus, any desired element can be selected by passing currents through these windings. If a two-dimensional array is used, a desired element is selected by passing current through corresponding vertical and horizontal windings. The magnitude of the current in each of the two windings must be sufficient to produce a magnetomotive force of at least half the amount required to switch the element and must be less than the full value of the magnetomotive force required for switching. This effective range of current values is also called the selection ratio. Departures from rectangularity of the hysteresis loop of the magnetic material employed will narrow the range of currents available. Further, since the time required for switching a magnetic element is directly related to the amount of current available for switching, the maximum value thus placed on permissible currents also limits the switching time of the magnetic element to relatively long duration.

Although the critical selection ratio has been broadened by many complex and expensive techniques, all of the improvements which have been made still require the use of magnetic toroids as the basic magnetic element. Such toroid elements are severely limited in their operation in several respects which have already been pointed out, such as relatively high power requirements, relatively slow switching speeds, and inefficient space utilization.

It is accordingly, an object of this invention to provide a magnetic element providing faster operation than conventional magnetic elements.

Another object of this invention is to provide a magnetic element requiring relatively little power for operation.

A further object of this invention is to provide a magnetic element constructed of thin films and requiring a minimum of surface area.

A still further object of this invention is to provide a memory element suitable for use in a coincident current memory system and which is not subject to the limitation of the critical selection ratio.

Still another object of this invention is to provide a magnetic element adapted to function as an "and" gate.

This invention provides a novel magnetic device made up of a plurality of superimposed thin film layers composed variously of magnetic, conducting, and insulating materials and in which the conducting layers constitute drive windings and an output winding. Energization of one or more of the drive windings results in a temporary magnetic nonequilibrium state in which at least one pair of magnetic layers is forced through a relatively high magnetostatic energy configuration. This nonequilibrium state will decay into a stable state of lower magnetostatic energy. The geometrical arrangement is such that the magnetic layer coupled to the output winding will only reverse its magnetic state when all of the drive windings are energized simultaneously. Such a device may be used like a toroid to provide an "and" gate and may also be used as the basic magnetic element in a coincident current memory system without being subject to the critical selection ratio requirement.

The above-mentioned and other features and objects of this invention and the manner of obtaining them will become more apparent by reference to the following description taken in conjunction with the accompanying drawings wherein.

Figure 1:
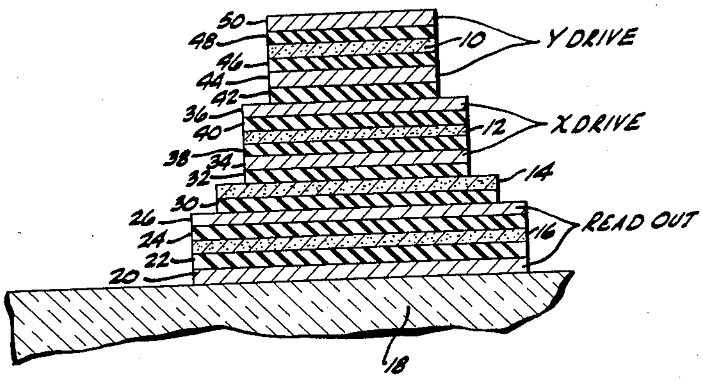
FIG. 1 is a distorted and enlarged sectional view, with lead wires removed, of a thin film structure representing a memory element or "and" gate embodying this invention, and indicating a sequence of deposition of the various layers, the section being taken transversely of the memory element.
Figure 2:
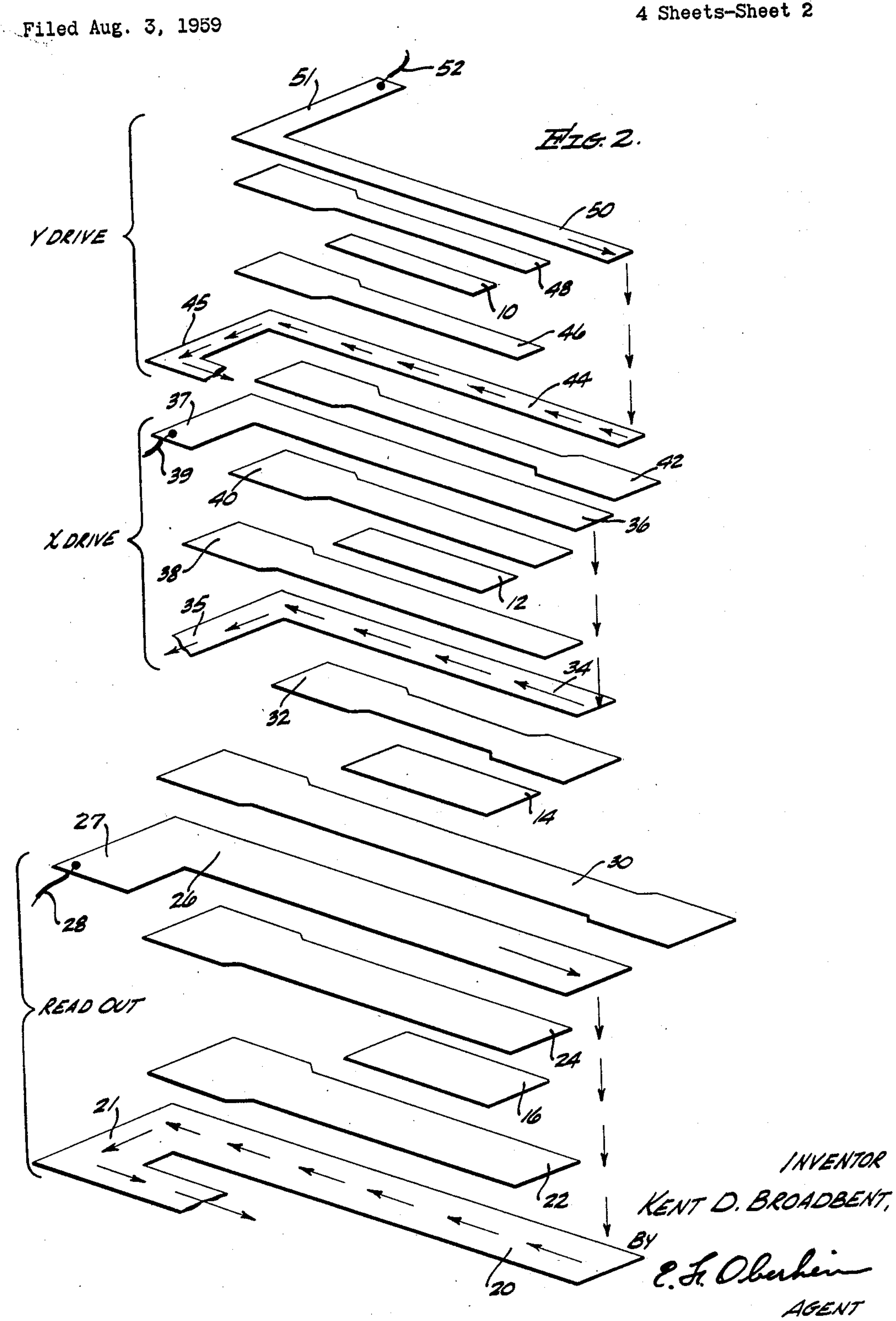
FIG. 2 is an exploded and enlarged view of the thin film layers comprising the embodiment of FIG. 1 and and indicating a sequential order of deposition.

Turning now to a detailed description of the embodiment of FIGS. 1 and 2, there are provided four thin film magnetic layers 10, 12, 14, and 16, of uniform thickness and length but unequal widths, with the layer 10 having the smallest width. Associated with each of the magnetic layers are various conducting and insulating layers which will be described in detail below.

The device of FIGS. 1 and 2 is preferably manufactured by depositing the various layers sequentially on substrate 18 (not illustrated in FIG. 2), starting with the lowest layer 20. Thus, the first layer to be deposited is a conducting layer 20.

As is shown in FIG. 2, the left end section 21 of the conducting layer 20 has a U-shape so that it may continue to a corresponding conducting layer in another memory element if such is desired. The right end section of the conducting layer 20 extends beyond the magnetic layer 16. The second layer is an insulating layer 22 which is provided with a flared left end section of relatively larger width. The insulating layer 22 prevents electrical contact between magnetic element 16 and conducting layer 20. The third layer is the magnetic layer 16 which is deposited above the insulating layer 22.

Immediately above the magnetic layer 16 is another insulating layer 24 exactly similar in shape to the insulating layer 22, and above the insulating layer 24 is deposited a second conducting layer 26. The conducting layer 26 is provided with a tab 27 at its left end section which tab is adapted to be connected to an associated read-out wire 28. The right end section of the conducting layer 26 extends beyond the magnetic layer 16 and is deposited to electrically contact the corresponding right end section of the conducting layer 20.

This arrangement of the conducting layers 20 and 26 defines a single turn tightly coupled around the magnetic layer 16. The conducting layers 20 and 26 thus comprise a read-out winding.

The conducting layers 20 and 26 are each insulated from the magnetic layer 16 by the insulating layers 22 and 24. Both of the ends of the insulating layers 22 and 24 extend beyond both ends of the magnetic layer 16. However, the right end sections of the insulating layers 22 and 24 terminate so as to allow the conducting layers 20 and 26 to form a continuous electrical circuit, as indicated by the broken arrows in FIG. 2. At their left end section, the insulating layers 22 and 24 are flared out to assure the nonengagement of the conducting layers 20 and 26 at this end portion.

If a voltage is generated in the read-out wire 28, an electrical current will be transmitted through the conducting layers in a fashion indicated by the arrows shown in FIG. 2, and thence to an adjacent memory element if such is provided, or directly to a read-out circuit.

The next layer is an insulating layer 30. The insulating layer 30 is deposited over the conducting layer 26 so as to insulate the conducting layer 26 from the remaining layers to be deposited above. Thus, the insulating layer 30 is provided with two flared end portions and extends longitudinally beyond the ends of the conducting layer 26.

The next layer is the magnetic layer 14. Above the magnetic layer 14 is deposited an insulating layer 32 having two flared end sections. The conducting layer 34 is deposited over the insulating layer 32 such that the insulating layer 32 completely insulates the conducting layer 34 from the magnetic layer 14. The conducting layer 34 has its right end portion within the end of the insulating layer 32.

The left end section of the conducting layer 34 is provided with an angular portion 35 designed to extend either to another memory element, if such is desired, or to a source of electrical current as will be more fully explained hereinafter. The right end section of the conducting layer 34 electrically contacts the corresponding right end section of a cooperating conducting layer 36 as indicated by the broken arrows. The conducting layers 34 and 36 are separated by insulating layers 38 and 40 with the magnetic layer 12 deposited therebetween. The right end portions of the insulating layers 38 and 40 extend beyond magnetic layer 12 and within the end portions of the conducting layers 34 and 36. The left end portions of the insulating layers 38 and 40 are flared to prevent electrical contact of the conducting layers 34 and 36 at this portion.

The conducting layer 36 has a tab 37 at its left end portion with a wire 39 connected thereto. The wire 39 is adapted to be connected to a source of electric current. This arrangement of the conducting layers 34 and 36 defines a single turn tightly coupled around the magnetic layer 12.

Another series of layers is then superimposed upon the structure described so far. These include an insulating layer 42, a conducting layer 44, an insulating layer 46, the magnetic layer 10, an insulating layer 48, and a conducting layer 50. The layers 44, 46, 10, 48, and 50 are respectively similar to the layers 32, 34, 38, 12, 40, and 36 in shape and function, the only difference being the difference in width shown in FIGS. 1 and 2.

As can also be seen in FIGS. 1 and 2, the layers 20, 22, 16, 24, and 26 are of equal width in their principal portions. The layers 30 and 14 are of equal but smaller width than the preceding five layers. The layers 32, 34, 38, 12, 40, and 36 are of equal but smaller width than the preceding two layers. The layers 42, 44, 46, 10, 48, and 50 are of equal but smaller width than the preceding six layers.

Furthermore, the tab portion 45 of the conducting layer 44 has a U-shape and is adapted to be connected to another memory element if desired. The tab portion 51 of the conducting layer has a wire 52 connected thereto, which wire is adapted to be connected to a source of electric current. An effective single turn winding is formed by the conducting layers 44 and 50 looped about the magnetic layer 10.

In FIGS. 1 and 2 the winding formed by the conducting layers 34 and 36 is designated the "X" drive, and the winding formed by the conducting layers 44 and 50 is designated the "Y" drive.

In selecting possible magnetic materials and substrates, reference may be made to an article entitled, "Preparation of Thin Films and Their Properties," by M. S. Blois, Jr., in the Journal of Applied Physics, vol. 26, August 1955, at pp. 975–980. This article sets out the various characteristics and properties of available materials.

The substrate 18, as discussed in the aforementioned article, should be an insulating medium. A suitable substrate has been found to be commercially available soft glass. A suitable magnetic material for layers 16, 14, 12 and 10 has been found to be 80%–20% nickle-iron alloy. The conducting layers, such as 20 and 26, may be composed of aluminum and the insulating layers, such as 22 and 24, may be silicon monoxide. The thickness of the conducting and insulating layers may be approximately 10,000 A. (Angstrom units), while the thickness of the magnetic layers may be approximately 6,000 A. However, the thickness of the magnetic film layers is governed at the lower limit by the disappearance of ferromagnetic properties while the occurrence of significant eddy-current losses at the relatively high frequencies used in digital computing devices governs the upper limit of said thickness.

The operation of the basic memory element of FIGS. 1 and 2 will now be described. When an electric current is introduced into a drive winding such as the "Y" drive winding, shown in FIG. 2, which is composed of the conducting layers 44 and 50, a magnetic field will be produced in a direction transverse to the flow of current. This magnetic field will induce a corresponding magnetization of the magnetic layer 10 enclosed by this drive winding.

Similarly, the direction of magnetization of the magnetic layer 12 can be controlled by the introduction of current into the "X" drive winding shown in FIG. 2. This "X" drive winding is composed of the conducting layers 34 and 36.

If an output winding, such as provided by the conducting layers 20 and 26, is looped about the magnetic layer 16, a reversal of the direction of magnetization of the layer will produce an electrical voltage in the output winding. It can be appreciated that if a larger output voltage is desired, the length of the magnetic layer 16 may be increased. However, an increase in the length of the magnetic layer 16 does not imply that the input current must be correspondingly increased, since the amount of input current required depends merely upon the magnetic path length. No increase in path length results from an increase in the length of the magnetic layer 16, since this increase is perpendicular to the direction of the magnetic field within the magnetic layer. If magnetization of the magnetic layer 16 in a first direction is chosen to represent a binary "zero" and magnetization in an opposite direction is chosen to represent a binary "one," appropriate electrical signals can be obtained to indicate transitions from a "zero" state to a "one" state or vice versa.

In the device described herein the four magnetic layers 10, 12, 14, and 16 are disposed such that the magnetostatic energy for the magnetic layers may be relatively high or relatively low depending upon the directions of magnetization of the individual magnetic layers. Lower magnetostatic energy levels, which correspond to stable configurations, can be obtained when any two of the four magnetic layers are magnetized in a first direction and the remaining two layers are magnetized in the opposite direction. Any other configuration, in which more than two of the magnetic layers are magnetized in the same direction, results in excessively high magnetostatic energy levels which are unstable and quickly decay to a stable condition.

It should be pointed out that the distance between the four magnetic layers must be extremely small. Such distances are ideally produced by the vacuum deposition techniques here proposed. In fact, the edges of the magnetic layers are made immediately adjacent if possible. This provides the minimum possible distance between magnetic layers since actual magnetic continuity is not fully realizable because of oxide coatings formed on the magnetic layers as deposited, and because of other factors such as the extremely small radius of curvature in the volume connecting adjacent magnetic layers. However, actual magnetic continuity between layers 10, 12, 14, and 16 is neither necessary nor desirable for the operation of this device, and the use of adjacent layers provides the optimum device which can be fabricated.

In the description which follows, a pair of oppositely magnetized layers forming a magnetic circuit will be referred to as complementary planes. Complementary planes may be, for example, the layers 10 and 12 or 10 and 14; the layers 14 and 16 or 12 and 16.

In the device shown in FIGS. 1 and 2, the four superimposed evaporated magnetic layers 10, 12, 14, and 16 are constructed so that the effective magnetic width of each of the magnetic layers is different, the upper layer 10 having the smallest width and the lowest layer 16 the largest. When the memory element is in a stable stage, i.e., a relatively low magnetostatic energy configuration, a system of two pairs of complementary planes exists. It is immaterial for the purpose of this invention which two particular layers may be associated as a pair since any pairing among the four layers will provide an equilibrium state, and any other configuration will be a nonequilibrium or high magnetostatic energy configuration.

Assuming now an initial equilibrium state, it will be shown that energization of less than all of the drive windings cannot cause a reversal of the direction of magnetization of the lowest magnetic layer 16.

It should be understood that the energy required to reverse the direction of magnetization of a magnetic layer depends upon the volume of magnetic material included in the particular layer. Since each of the magnetic layers employed in this device has the same thickness, the energy required to reverse the direction of magnetization of a particular layer will be proportional to its effective magnetic width.

The state of a memory element is characterized by the direction or sense of magnetization of the lowest layer 16 since the layer 16 is provided with an output winding. For the purpose of this discussion, the direction of magnetization will be represented as "zero" when pointing left and "one" when pointing right. As will be apparent hereinafter, the widest layer must be the output layer. To show the operation of the memory element, it is necessary to consider two different initial states.

In the first initial state, the two upper layers 10 and 12 will be assumed to be magnetized in a first direction and the two lower layers 14 and 16 will be assumed to be magnetized in an opposite direction. For the structure herein described, such a magnetization configuration comprises a low magnetostatic energy state because of the resulting complementary plane configuration.

Each of Tables I and II given below consists of three diagrams. Diagrams I*a* and II*a* show the result of the energization of the "Y" drive winding alone. Diagrams I*b* and II*b* show the result of the energization of the "X" drive winding alone, and diagrams I*c* and II*c* show the result of the energization of both windings.

Column 1 in all six diagrams I*a* through II*c* identifies the various magnetic layers, column 2 shows the initial states of magnetization of the four magnetic layers 10, 12, 14, and 16, column 3 shows the magnetic configuration after energization of one or more of the drive windings and the resultant transient high magneto-static energy configuration, and column 4 shows the response of the system when the temporary high magneto-static energy transient state has decayed to a lower energy state.

*Table I*

I*a*.—ENERGIZATION OF "Y" WINDING ALONE

| Layer | Initial State | Transient State | Final State |
|---|---|---|---|
| Layer 10 (Y Drive) | → | ← | ← |
| Layer 12 (X Drive) | → | → | → |
| Layer 14 | ← | ← | → |
| Layer 16 (Output) | ← | ← | ← |

I*b*.—ENERGIZATION OF "X" WINDING ALONE

| Layer | Initial State | Transient State | Final State |
|---|---|---|---|
| Layer 10 (Y Drive) | → | → | → |
| Layer 12 (X Drive) | → | ← | ← |
| Layer 14 | ← | ← | → |
| Layer 16 (Output) | ← | ← | ← |

I*c*.—ENERGIZATION OF "X" AND "Y" WINDINGS SIMULTANEOUSLY

| Layer | Initial State | Transient State | Final State |
|---|---|---|---|
| Layer 10 (Y Drive) | → | ← | ← |
| Layer 12 (X Drive) | → | ← | ← |
| Layer 14 | ← | ← | → |
| Layer 16 (Output) | ← | ← | → |

Diagrams I*a*, I*b*, and I*c* of Table I show that, starting with the given initial conditions, energization of either the "X" winding (conducting layers 34 and 36), or the "Y" winding (conducting layers 44 and 50), will not cause a reversal of the direction of magnetization of the lowest layer 16. However, energization of both of the "X" and "Y" windings in a direction causing reversal of the direction of magnetization of the magnetic layers 10 and 12 will result in a reversal of the lowest layer 16.

Diagram I*a* shows the result of energizing the "Y" drive winding in a manner which causes a reversal of the direction of magnetization of the upper layer 10. Such a reversal results in the layers 10 and 12 forming a complementary plane configuration with a resultant relatively low magnetostatic energy state, leaving layers 14 and 16 in a non-complementary configuration because of their parallel and like-directed magnetizations.

The memory element is so constructed that the resultant high magnetostatic energy state of the two lower layers 14 and 16 is unstable, requiring reversal of one of the layers in order for stability to obtain again. Since the memory element is further constructed such that the layer 14 has a smaller effective magnetic width than the layer 16, less energy is required to switch the direction of magnetization of the layer 14 than is required to switch the layer 16. Since the decay from the higher energy state will proceed by a path involving minimum expenditure of energy, layer 14 will reverse leaving layer 16 in its initial state, as shown in column 4 of diagram I*a*. Since only a reversal of the direction of magnetization of the lowest layer 16 can provide read-out voltage, as stated above, no read-out voltage will result from the energization of the "Y" drive winding, as described above.

Diagram I*b* shows the result of the energization of the "X" drive winding in a manner which causes a reversal of the direction of magnetization of the magnetic layer 12. This reversal results in the layers 10 and 12 forming a complementary plane configuration of relatively low magnetostatic energy. Layers 14 and 16 will again be forced into a non-complementary plane configuration because of their parallel and like-directed magnetization. Further, for the reasons given above, the layer 14 will reverse its direction of magnetization leaving layer 16 in its initial state. Thus, no read-out voltage will appear as a result of the energization of the "X" drive winding alone.

Diagram I*c*, however, shows the result when the direction of magnetization of both layers 10 and 12 are reversed by the energization of the "X" drive winding and the "Y" drive winding simultaneously. These reversals result in a relatively high energy state since layers 10, 12, 14, and 16 are all held in states of like-directed magnetization and the reversal of both layers 14 and 16 is required to form the necessary pair of complementary plane configurations and a consequent stable low magnetostatic energy state. This reversal of the direction of magnetization of the lowest layer 16 will produce an output voltage, as has been stated before.

The second initial stable state which must be considered is shown in Table II in diagrams II*a*, II*b*, and II*c* below.

*Table II*

II*a*.—ENERGIZATION OF "Y" WINDING ALONE

| Layer | Initial State | Transient State | Final State |
|---|---|---|---|
| Layer 10 (Y Drive) | → | ← | ← |
| Layer 12 (X Drive) | ← | ← | → |
| Layer 14 | → | → | → |
| Layer 16 (Output) | ← | ← | ← |

II*b*.—ENERGIZATION OF "X" WINDING ALONE

| Layer | Initial State | Transient State | Final State |
|---|---|---|---|
| Layer 10 (Y Drive) | → | → | ← |
| Layer 12 (X Drive) | ← | → | → |
| Layer 14 | → | → | → |
| Layer 16 (Output) | ← | ← | ← |

II*c*.—ENERGIZATION OF "X" AND "Y" WINDINGS SIMULTANEOUSLY

| Layer | Initial State | Transient State | Final State |
|---|---|---|---|
| Layer 10 (Y Drive) | → | ← | ← |
| Layer 12 (X Drive) | ← | ← | ← |
| Layer 14 | → | → | → |
| Layer 16 (Output) | ← | ← | → |

As in the case of the first initial state, it can here be seen in diagrams II*a* and II*b* that energization of either the "Y" or "X" drive windings alone will not produce an output, since layer 16 does not change its direction of magnetization. However, energization of both the "X" and "Y" drive windings simultaneously and holding the magnetic fields during the transient state will produce an output as shown in diagram II*c*, since the direction of magnetization of layer 16 is reversed.

The sequence of events described in Tables I and II is given to provide a simple cause and effect description of the operation of this device. However, although the basic operation is as described above, events may actually overlap in complicated temporal relationships. Also, the simple complementary plane interactions described above, while giving a general representation of the operation of the device, do not rigorously describe the detailed complex interactions of the over-all system.

Figure 3:
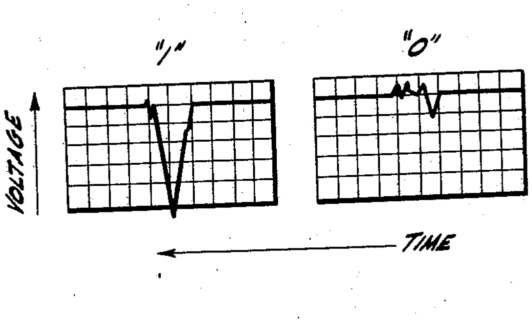
FIG. 3 is a graphical representation of typical output waveforms resulting from the simultaneous pulsing of the drive windings of the embodiments of FIG. 1 or FIG. 5, having time as the abscissa and voltage as the ordinate.

FIG. 3 shows the amplitudes of signals which have been derived from the memory element upon the occurrence of coincident drive signals, in which the abscissa represents time and the ordinate represents voltage. If peak amplitudes are considered, it can be seen that the discrimination between a signal representative of binary "one" and a signal representative of binary "zero" is better than five to one. Signal-to-noise ratios considerably better than five to one have been achieved.

It will be appreciated that the device shown in FIGS. 1 and 2 may also be used as an "and" gate. In that case, the magnetic layer 10 is coupled to an input circuit by introducing the first input signal across the conducting layers 44 and 50. The magnetic layer 12 is coupled to a second input circuit by introducing the second input signal across the conducting layers 34 and 36. The magnetic layer 16 would provide an output signal across the conducting layers 20 and 26. The operation as an "and" gate is identical to the operation already described.

Figure 4:
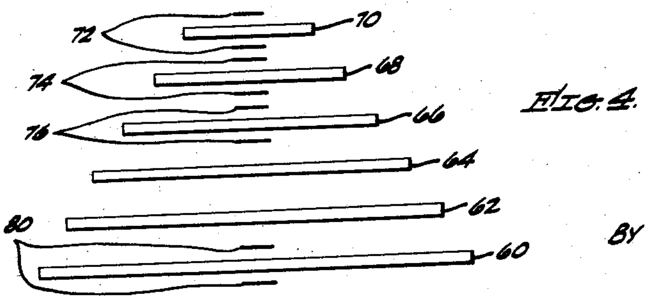
FIG. 4 is a distorted and enlarged schematic sectional view of an "and" gate embodying this invention.

FIG. 4 shows, in schematic form, an "and" gate adapted to receive three input signals constructed in accordance with this invention. Six magnetic layers 60, 62, 64, 66, 68, and 70, of increasing widths as shown are provided, with layer 60 having the largest width and layer 70 the smallest width. The magnetic layer 70 is coupled to a first input winding 72, shown schematically; the magnetic layer 68 is coupled to a second input winding 74, shown schematically; and the magnetic layer 66 is coupled to a third input winding 76, also shown schematically. The magnetic layer 60 is coupled to an output winding 80, shown schematically. It can be seen that two magnetic layers with associated conducting layers have been added. One of the added magnetic layers, such as the layer 70, provides an additional input. However, it is necessary to provide also an associated complementary magnetic layer, such as the layer 64, whenever an input layer 70 is added. It should be understood that suitable insulation must be provided between all of the various conducting and magnetic layers shown in FIG. 4. The operation of this device is similar to the operation of the two-input "and" gate already described particularly with reference to Tables I and II. If still more input circuits are desired, two magnetic layers with associated conducting and insulating layers will generally be provided for each such additional input. The functions of the added layers have been described above.

Figure 5:
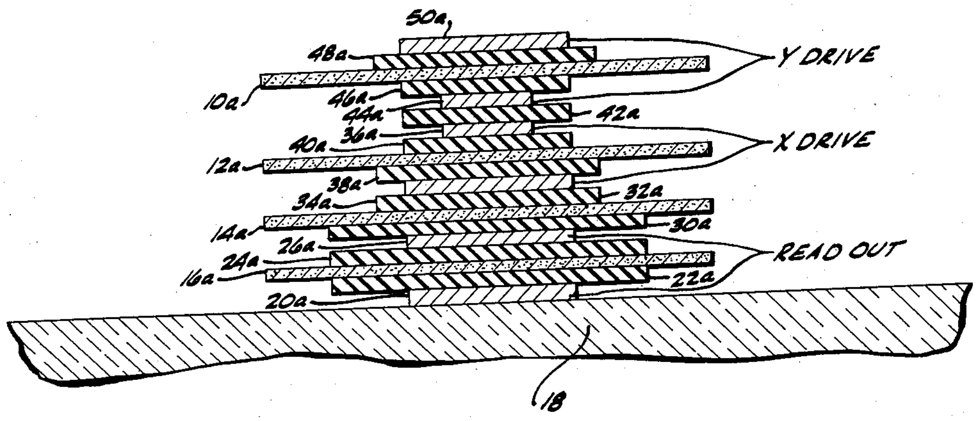
FIG. 5 is a distorted and enlarged sectional view, with lead wires removed, of another embodiment of this invention, and indicating a sequence of deposition of the layers, the section being taken transversely of this embodiment of this invention.
Figure 6:
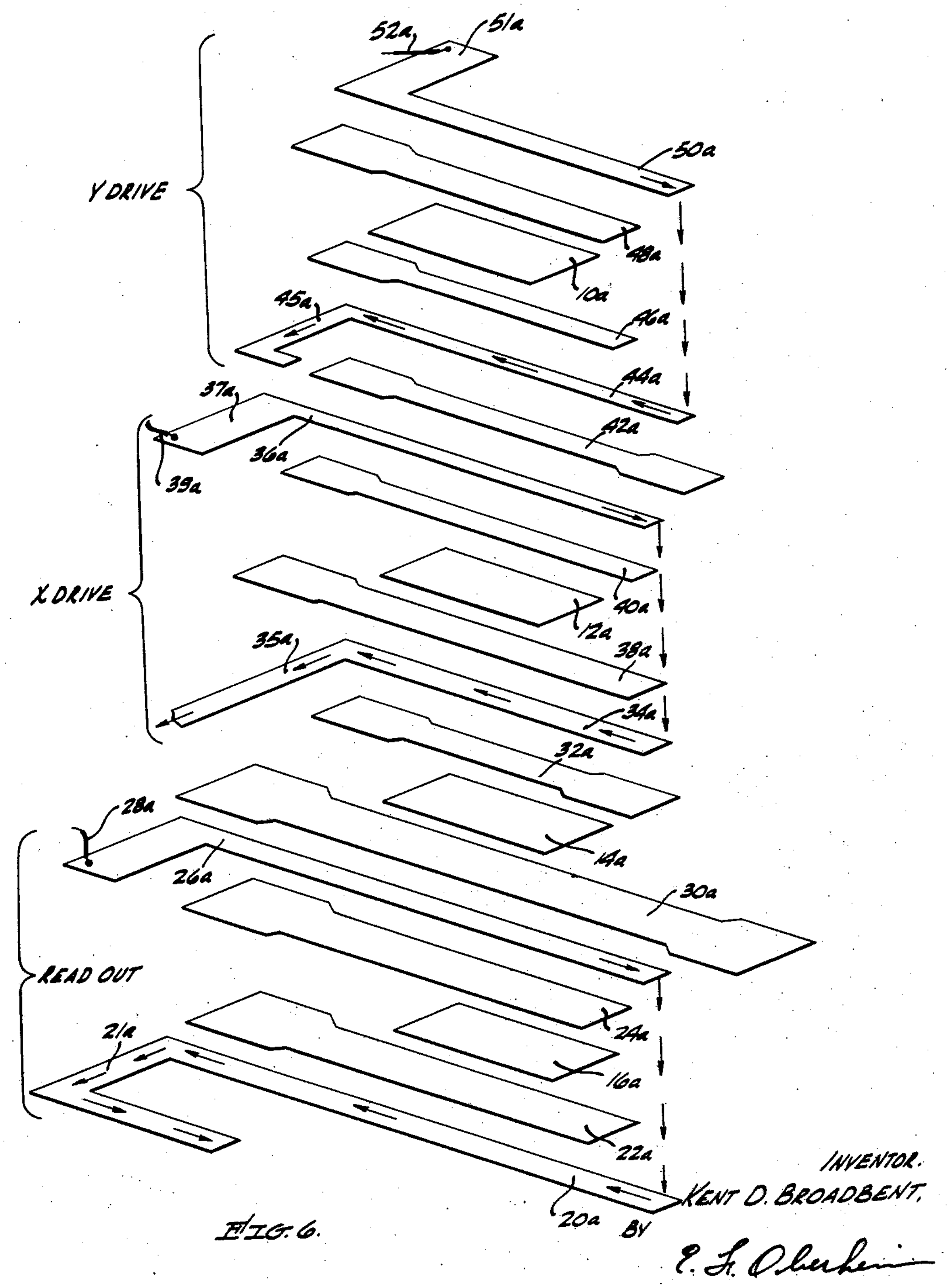
FIG. 6 is an exploded and enlarged view of the thin film layers comprising the embodiment of FIG. 5, and indicating a sequential order of deposition.

FIGS. 5 and 6 show a second embodiment of the memory element of this invention. In FIGS. 5 and 6 the layers having corresponding functions to those already described in connection with FIGS. 1 and 2 have been given the same reference numeral with the letter "*a*." In the embodiment of FIGS. 5 and 6 the thickness of the layers, the general physical configuration, the materials composing the layers, and the function of the layers are the same as those of the corresponding layers described above in connection with FIGS. 1 and 2. The difference lies in the fact that in the embodiment of FIGS. 5 and 6 the magnetic layers 10*a*, 12*a*, 14*a*, and 16*a* each have the same width. However, due to the differences of the widths of the conducting and insulating layers, the effective magnetic widths of each of the magnetic layers is different in the same manner as the effective magnetic widths of the magnetic layers 10, 12, 14, and 16 of FIGS. 1 and 2 are different. For example, the conducting layers 44*a* and 36*a* are narrower than the conducting layers 34*a*, 26*a*, and 20*a*. Hence, the configuration shown in FIGS. 5 and 6 yields a device which operates in the same manner as does the embodiment shown in FIGS. 1 and 2. It should be noted that FIG. 5 does not represent a true picture of this embodiment, since the overhanging portions of the layers shown will naturally overlap when deposited. The widths of the principal portions of the layers forming the embodiment of FIGS. 5 and 6 are listed below.

| Layer: | Width, inches |
|---|---|
| **20***a* | 0.013 |
| **22***a* | 0.025 |
| **16***a* | 0.035 |
| **24***a* | 0.025 |
| **26***a* | 0.013 |
| **30***a* | 0.025 |
| **14***a* | 0.035 |
| **32***a* | 0.018 |
| **34***a* | 0.013 |
| **38***a* | 0.018 |
| **12***a* | 0.035 |
| **40***a* | 0.013 |
| **36***a* | 0.0065 |
| **42***a* | 0.013 |
| **44***a* | 0.0065 |
| **46***a* | 0.013 |
| **10***a* | 0.035 |
| **48***a* | 0.018 |
| **50***a* | 0.013 |

It should be noted that the dimensions indicated hereinabove for the various thin film layers are not to be considered as limited thereto, but are merely indicative of a presently preferred structure compatible with thin film considerations.

Because of the energy and geometrical characteristics of the memory elements shown in FIGS. 1 and 2, or 5 and 6, the "X" and "Y" drive currents may vary individually by as much as an order of magnitude. Thus, magnetic materials having variations in coercivity of much more than the few percent allowable with conventional systems may be used with the embodiments of this invention, and much less stringent demands are made on the associated equipment used to provide the drive currents, in that current regulation is not critical.

The complementary plane configuration described above provides further advantages. For example, the embodiment of FIGS. 5 and 6 has been shown experimentally to provide an increase of a factor of more than ten in the operating speed of this memory element over conventional ferrite toroid memory elements.

Figure 7:
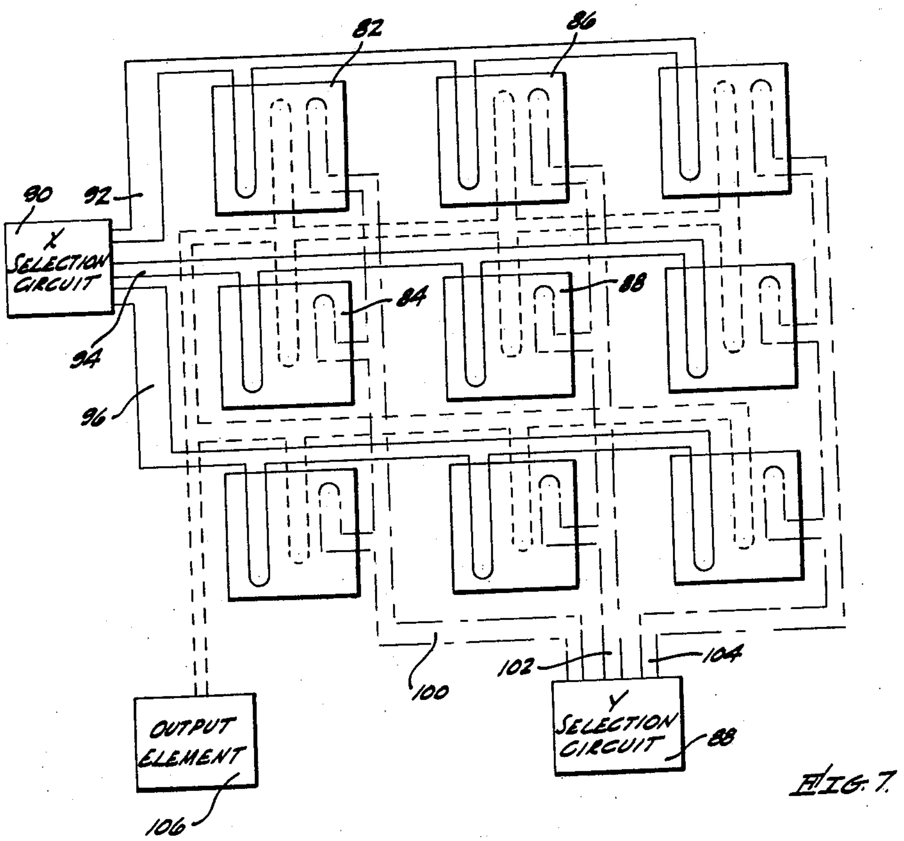
FIG. 7 is a schematic representation of a two-dimensional array of coincident current memory elements and other associated circuitry in accordance with the present invention.

FIG. 7 shows a two-dimensional array of magnetic elements which may be either the embodiment of FIGS. 1 and 2 or the embodiment of FIGS. 5 and 6. The boxes 82, 84, 86, and 88 designate certain magnetic elements in the array. An "X" selection circuit 90 is shown connected to the pairs of "X" leads designated as 92, 94, and 96 such that the energization of one of the pairs of leads results in passing current through an appropriate "X" row of memory elements. For example, if the pair of "X" leads 92 is energized, current will be passed through the elements 82 and 86. A "Y" selection circuit 98 is shown connected to the pairs of "Y" leads designated as 100, 102, and 104 such that energization of an appropriate pair will pass current through a selected "Y" column of memory elements. For example, if the pair of "Y" leads 100 is energized, current will pass through the memory elements 82 and 84. A read-out or output element 106 is shown connected to each memory element in the array in series connection. If a selected "X" pair of leads such as 92 is energized, along with a selected "Y" pair of leads such as 100, a particular element 82 receives current from both selected pairs and provides an output signal if a reversal of the magnetic state of the element is effected.

In general, arrays of magnetic element are well-known in the art. However, in prior art arrays, as has been discussed above, the magnitude of the current in each pair of leads must be sufficient to produce a magnetomotive force in the selected element, of at least one-half the amount required to switch the element, and must produce a magnetomotive force less than the full value required for switching the element.

If the magnetic elements forming the array are constructed according to this invention, this critical selection ratio is no longer important and as much current as may be desired may be passed through the selected "X" pair 92 and the selected "Y" pair 100 without switching other elements in the selected "X" or "Y" column.

Successful operation of an array has been obtained with pulses on the "X" and "Y" leads which rose to 400 milliamperes in 0.1 microsecond. However, lower values of drive current have successfully switched an element. Further, the drive current has been increased by a factor of six, the maximum current which could be supplied by the equipment available, without causing any malfunction of the array. The time which is required for a particular element to reverse its direction of magnetization has been observed to be less than 80 millimicroseconds ($80\times10^{-9}$ seconds).

The arrangement of the films illustrated in FIGS. 1 and 2, or 5 and 6 shows not only the structure of the device but also indicates a sequence of deposition of the thin film layers which has been used to produce the device. When a thin film memory array is desired to be constructed in accordance with this invention, all of the thin film layers comprising the "X" and "Y" drive windings, along with the read-out winding, are deposited simultaneously on the substrate in accordance with the wiring shown in FIG. 7 as an example. That is, a particular layer is deposited simultaneously for all of the memory elements composing the array. The insulating and magnetic layers are similarly deposited simultaneously in that the deposition of a particular layer is performed simultaneously for each element in the memory array. In this manner, a complete memory array can be deposited in the same number of depositions required for a single memory element.

If, in the array shown in FIG. 7, the memory elements are positioned on planes 0.025 inch apart, twenty thousand memory elements can be contained in one cubic inch. However, if higher density of elements is desired, a single substrate could support not only a single memory array as shown in FIG. 7, but many two-dimensional arrays superimposed upon one another and separated by suitable insulating sheets. It is believed that such an arrangement will provide a density of approximately one-half million memory elements per cubic inch.

The vacuum evaporation technique employed in constructing this novel magnetic element is conventional and well-known in the art. Suffice it to say for the purposes of this invention that the magnetic element may be built up by the sequential evaporation under vacuum of each thin film layer by means of individual masks having the configuration of the desired layer to be deposited. However, thin film devices may also be produced by other techniques than vacuum deposition. For example, the required configurations of conducting, insulating, and magnetic films may be produced by such processes or combinations of processes as electrodeposition, electrophoresis, silk screening technique, or various inking, etching, and printing techniques which allow thin planes of materials to be defined, registered, and applied upon a sub-surface.

In the embodiments of the magnetic element described above, a rectangular shape of the deposited magnetic layers was specified. Such a shape does provide some of the advantages enumerated, such as uniform magnetic path lengths and relatively efficient control of output voltage as well as speed of operation well in excess of speeds obtainable with conventional core elements. However, in general the rectangular shape is presently believed to be less than optimum if speed of operation is the most important factor. In such a case, circular or oval configurations have been utilized to provide switching speeds far in excess of anything presently obtainable with conventional core devices.

It will now be appreciated that a new thin film magnetic elements has been disclosed. The basic magnetic thin film structure herein described has been shown to have special and desirable properties when used as a memory element such as employed in binary random access memories and in multi-input gating elements. The advantages provided by this invention include extremely fast operation, extremely wide latitude in permitted variation of operating currents, wide latitude in permitted variations in magnetic characteristics of materials employed, extremely small volume and relatively simple production and assembly.

What is claimed is:

1. A multiple path magnetic element comprising a plurality of magnetically coupled superimposed layers of magnetizable material, said layers of magnetizable material defining respective magnetic flux paths of differing lengths, first conductor means magnetically coupled to a first of said layers, second conductor means magnetically coupled to a second of said layers, and third conductor means magnetically coupled to a third of said layers.

2. A multiple path magnetic element comprising a plurality of magnetically coupled superimposed layers of magnetizable material, said layers of magnetizable material defining magnetic flux paths of differing lengths, first conductor means magnetically coupled to a first of said layers and adapted to receive first electrical signals and to magnetize said first layer in accordance with said first signals, second conductor means magnetically coupled to a second of said layers and adapted to receive second electrical signals and to magnetize said second layer in accordance with said second signals, and third conductor means magnetically coupled to a third of said layers and adapted to provide output signals in accordance with the state of magnetization of said third layer.

3. A multiple path magnetic element comprising a first layer of magnetizable material adapted to be magnetized in either of two directions, a second layer of magnetizable material magnetically coupled to said first layer and adapted to be magnetized in either of said directions, and a third layer of magnetizable material magnetically coupled to said first and second layers and adapted to be magnetized in either of said directions in accordance with the states of magnetization of said first and second layers.

4. A multiple path magnetic element comprising a first substantially planar layer of magnetizable material adapted to be magnetized in either of two directions, first conductor means magnetically coupled to said first layer and adapted to receive first electrical signals and to magnetize said first layer in accordance with said first signals, a second substantially planar layer of magnetizable material magnetically coupled to said first layer and adapted to be magnetized in either of said directions, second conductor means magnetically coupled to said second layer and adapted to receive second electrical signals and to magnetize said second layer in accordance with said second signals, third and fourth substantially planar layers of magnetizable material magnetically coupled to said first and second layers and adapted to be magnetized in either of said directions in accordance with the states of magnetization of said first and second layers, and third conductor means magnetically coupled to said fourth layer and adapted to provide output signals in accordance with the state of magnetization of said fourth layer.

5. A multiple path magnetic element comprising a first layer of magnetizable material adapted to be magnetized in either of two directions, a second layer of magnetizable material magnetically coupled to said first layer and adapted to be magnetized in either of said directions, and a third layer of magnetizable material magnetically coupled to said first and second layers and adapted to be magnetized in either of said directions in accordance with the states of magnetization of said first and second layers, and in which said layers of magnetizable material define respective magnetic flux paths of differing lengths.

6. A multiple path magnetic element comprising a first substantially planar layer of magnetizable material adapted to be magnetized in either of two directions, first conductor means magnetically coupled to said first layer and adapted to receive first electrical signals and to magnetize said first layer in accordance with said first signals, a second substantially planar layer of magnetizable material magnetically coupled to said first layer and adapted to be magnetized in either of said directions, second conductor means magnetically coupled to said second layer and adapted to receive second electrical signals and to magnetize said second layer in accordance with said second signals, third and fourth substantially planar layers of magnetizable material magnetically coupled to said first and second layers and adapted to be magnetized in either of said directions in acordance with the states of magnetization of said first and second layers, and third conductor means magnetically coupled to said fourth layer and adapted to provide output signals in accordance with the state of magnetization of said fourth layer, and in which said layers of magnetizable material define respective magnetic flux paths of differing lengths.

7. A multiple path magnetic element comprising a first substantially planar layer of magnetizable material adapted to be magnetized in either of two directions, first conductor means magnetically coupled to said first layer and adapted to receive first electrical signals and to magnetize said first layer in accordance with said first signals, a second substantially planar layer of magnetizable material magnetically coupled to said first layer and adapted to be magnetized in either of said directions, second conductor means magnetically coupled to said second layer and adapted to receive second electrical signals and to magnetize said second layer in accordance with said second signals, third and fourth substantially planar layers of magnetizable material magnetically coupled to said first and second layers and adapted to be magnetized in either of said directions in accordance with the states of magnetization of said first and second layers, and third conductor means magnetically coupled to said fourth layer and adapted to provide output signals in accordance with the state of magnetization of said fourth layer, and in which said layers of magnetizable material define respective magnetic flux paths of differing lengths, with the first of said layers defining the shortest flux path, the second of said layers defining the next longer flux path, and the fourth of said layers defining the longest flux path.

8. Apparatus according to claim 1 in which the thickness of said layers is greater than the minimum required to exhibit ferromagnetic properties and less than that thickness at which eddy-current losses in said material become significant.

9. Apparatus according to claim 3 in which the thickness of said layers is greater than the minimum required to exhibit ferromagnetic properties and less than that thickness at which eddy-current losses in this material become significant.

10. Apparatus according to claim 5 in which the thickness of said layers is greater than the minimum required to exhibit ferromagnetic properties and less than that thickness at which eddy-current losses in said material become significant.

11. A multiple path magnetic element according to claim 6 in which said layers of magnetizable material are of substantially equal widths.

12. A multiple path magnetic element according to claim 6 in which said layers of magnetizable material are of unequal widths.

13. A multiple path magnetic element comprising a plurality of substantially planar layers of magnetizable material adapted to be magnetized in either of two directions, a plurality of conductor means magnetically and individually coupled to said layers and adapted to receive electrical signals and to magnetize said layers in accordance with said signals, substantially planar output layer of magnetizable material magnetically coupled to said plurality of layers and adapted to be magnetized in either of said directions in accordance with the states of magnetization of said plurality of layers, and output conductor means magnetically coupled to said output layer and adapted to provide output signals in accordance with the state of magnetization of said output layer.

14. A multiple path magnetic element comprising a first substantially planar layer of magnetizable material adapted to be magnetized in either of two directions, first conductor means magnetically coupled to said first layer and adapted to receive first electrical signals and to magnetize said first layer in accordance with said first signals, a second substantially planar layer of magnetizable material magnetically coupled to said first layer and adapted to be magnetized in either of said directions, second conductor means magnetically coupled to said second layer and adapted to receive second electrical signals and to magnetize said second layer in accordance with said second signals, a third substantially planar layer of magnetizable material magnetically coupled to said first and second layers and adapted to be magnetized in either of said directions, third conductor means magnetically coupled to said third layer and adapted to receive third electrical signals and to magnetize said third layer in accordance with said third signals, fourth, fifth, and sixth substantially planar layers of magnetizable material magnetically coupled to said first, second, and third layers and adapted to be magnetized in either of said directions in accordance with the states of magnetization of said first, second, and third layers, and output conductor means magnetically coupled to said sixth layer and adapted to provide output signals in accordance with the state of magnetization of said sixth layer, and said layers of magnetizable material defining respective magnetic flux paths of differing lengths.

15. A multiple path magnetic element comprising $n$ substantially planar layers of magnetizable material magnetically coupled to each other and adapted to be magnetized in either of two directions, where $n$ is a positive integer greater than three, $m$ conductor means, each magnetically coupled to one of said layers and each adapted to receive electrical signals and to magnetize the layer to which it is coupled in accordance with said electrical signals, where $m$ is a positive integer greater than one, and output conductor means magnetically coupled to a predetermined one of said layers and adapted to provide output signals in accordance with the state of magnetization of said predetermined layer, and each of said layers of magnetizable material defining a magnetic flux path of different length.

16. A coincident current memory system comprising a plurality of multiple path magnetic storage elements, each of said elements being adapted to receive a plurality of electrical signals for assuming a magnetic state in accordance with said signals, selection circuitry connected with said elements for applying said plurality of electrical signals thereto and selecting a particular one of said storage elements, and output means coupled to each of said storage elements for detecting the magnetic state of the selected element and for supplying an electrical signal in accordance with said state, each of said magnetic storage elements comprising a first layer of magnetizable material adapted to be magnetized in either of two directions, a second layer of magnetizable material magnetically coupled to said first layer and adapted to be magnetized in either of said directions, and a third layer of magnetizable material magnetically coupled to said first and second layers and adapted to be magnetized in either of said directions in accordance with the states of magnetization of said first and second layers, and in which said layers of magnetizable material define respective magnetic flux paths of differing lengths.

17. A coincident current memory system comprising a plurality of multiple path magnetic elements, said elements each comprising a plurality of substantially planar layers of magnetizable material adapted to be magnetized in either of two directions, a plurality of conductor means magnetically and individually coupled to said layers and adapted to receive electrical signals and to magnetize said layers in accordance with said signals, a substantially planar output layer of magnetizable material magnetically coupled to said plurality of layers and adapted to be magnetized in either of said directions in accordance with the states of magnetization of said plurality of layers, and output conductor means magnetically coupled to said output layer and adapted to provide output signals in accordance with the state of magnetization of said output layer; selection circuitry for supplying said electrical signals to each of the plurality of conductor means of a selected one of said elements, and output means coupled to the output conductor means of each of the elements in the memory system and adapted to receive output signals in accordance with the state of magnetization of said selected element.

18. A coincident memory system comprising a plurality of multiple path magnetic elements forming an array composed of rows and columns, said elements each including a first substantially planar layer of magnetizable material adapted to be magnetized in either of two directions, first conductor means magnetically and individually coupled to said first layer and adapted to receive first electrical signals and to magnetize said first layer in accordance with said first signals, a second substantially planar layer of magnetizable material adapted to be magnetized in either of two directions, second conductor means magnetically and individually coupled to said second layer and adapted to receive second electrical signals and to magnetize said second layer in accordance with said second signals, a substantially planar output layer of magnetizable material magnetically coupled to said first and second layers and adapted to be magnetized in either of said directions in accordance with the states of magnetization of said first and second layers, and output conductor means magnetically coupled to said output layer and adapted to provide output signals in accordance with the state of magnetization of said output layer; a first set of connecting means equal in number to the number of said rows, each of said first set of connecting means being serially connected to all of said first conductor means in a predetermined row, a second set of connecting means equal in number to the number of said columns, each of said second set of connecting means being serially connected to all of said second conductor means in a different column, third connecting means series connected to all of said output conductor means in said array, first selection circuitry coupled to said set of first connecting means for supplying said first electrical signals to a particular first connecting means, second selection circuitry coupled to said set of second connecting means for supplying said second electrical signals to a particular second connecting means, and output means coupled to said output conductor means for providing output signals in accordance with the state of magnetization of a selected element.

References Cited in the file of this patent

UNITED STATES PATENTS 2,805,408 Hamilton -------------- Sept. 3, 1957

FOREIGN PATENTS 845,604 Great Britain ---------- Aug. 24, 1960

OTHER REFERENCES

Publication I: "New Developments in Magnetic Materials and Applications," by W. Arrott, published in "Electrical Manufacturing," February 1959.

Publication II: "Coincident-Current Nondestructive Readout From Thin Magnetic Films," Oakland and Rossing, Journal of Applied Physics, Supplement to vol. 30, No. 4, April 1959, pp. 54 and 55s. Div. 42.